US012683170B2

(12) United States Patent
Yamamoto et al.

(10) Patent No.: US 12,683,170 B2
(45) Date of Patent: Jul. 14, 2026

(54) SECONDARY BATTERY NEGATIVE ELECTRODE AND SECONDARY BATTERY

(71) Applicant: Panasonic Intellectual Property Management Co., Ltd., Osaka (JP)

(72) Inventors: Norihisa Yamamoto, Osaka (JP); Masahiro Soga, Osaka (JP); Takashi Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 634 days.

(21) Appl. No.: 18/028,700

(22) PCT Filed: Sep. 15, 2021

(86) PCT No.: PCT/JP2021/033830
§ 371 (c)(1),
(2) Date: Mar. 27, 2023

(87) PCT Pub. No.: WO2022/070904
PCT Pub. Date: Apr. 7, 2022

(65) Prior Publication Data
US 2023/0361307 A1     Nov. 9, 2023

(30) Foreign Application Priority Data
Sep. 30, 2020     (JP) ................................. 2020-165609

(51) Int. Cl.
*H01M 4/62* (2006.01)
*H01M 4/134* (2010.01)
(Continued)

(52) U.S. Cl.
CPC ........... *H01M 4/625* (2013.01); *H01M 4/134* (2013.01); *H01M 4/386* (2013.01); *H01M 4/622* (2013.01); *H01M 2004/021* (2013.01)

(58) Field of Classification Search
CPC ...... H01M 4/625; H01M 4/134; H01M 4/386; H01M 4/622
See application file for complete search history.

(56) References Cited

U.S. PATENT DOCUMENTS

2015/0368108 A1* 12/2015 Sone ........................ C08K 3/04
                                                              252/510
2016/0268608 A1    9/2016 Nishimura et al.
                    (Continued)

FOREIGN PATENT DOCUMENTS

CN        104936895 A      9/2015
CN        106252712 A     12/2016
                    (Continued)

OTHER PUBLICATIONS

Daiichi Kogyo Seiyaku Co. Ltd., editor, Cellulose Nanofiber/ RHEOCRYSTA, p. 1-8 (Searched on Jul. 28, 2025), https://www. dks-web.co.jp/pdf/catalog/rheocrysta.pdf, with English excerpt (6 pages); cited in JP Office Action dated Aug. 5, 2025.
                    (Continued)

*Primary Examiner* — Jimmy Vo
(74) *Attorney, Agent, or Firm* — WHDA, LLP

(57) ABSTRACT

A secondary battery negative electrode according to the present invention is provided with a negative electrode mixture layer comprising: a negative electrode active material that contains an Si compound; and a binding material that includes cellulose nanofibers having a fiber diameter of 9 nm or less and a conductive material containing single-walled carbon nanotubes having a fiber diameter of less than 4 nm. The content of the cellulose nanofibers is greater than or equal to 0.005 mass % and less than 0.2 mass % in relation to the mass of the negative electrode active material.

11 Claims, 1 Drawing Sheet

(51) Int. Cl.
  *H01M 4/38*      (2006.01)
  *H01M 4/02*      (2006.01)

(56)          References Cited

U.S. PATENT DOCUMENTS

| | | |
|---|---|---|
| 2019/0319261 A1 | 10/2019 | Uchiyama et al. |
| 2022/0200003 A1 | 6/2022 | Sofue et al. |

FOREIGN PATENT DOCUMENTS

| | | | | |
|---|---|---|---|---|
| CN | 107248592 A | 10/2017 | | |
| CN | 110581267 A | 12/2019 | | |
| CN | 111244455 A | 6/2020 | | |
| JP | 2016-110876 A | 6/2016 | | |
| JP | 2017-228456 A | 12/2017 | | |
| JP | 2020177849 A | * 10/2020 | ............ | H01G 11/38 |
| WO | 2014/115560 A1 | 7/2014 | | |
| WO | WO-2018101072 A1 | * 6/2018 | ............ | H01M 4/386 |

OTHER PUBLICATIONS

Luo Wei, et al. "Highly Conductive, Light Weight, Robust, Corrosion-Resistant, Scalable, All-Fiber Based Current Collectors for Aqueous Acidic Batteries" Advanced Energy Materials, 2018, vol. 8, No. 1702615, pp. 1-6 (Cited in the SR).

International Search Report dated Nov. 16, 2021, issued in counterpart International Application No. PCT/JP2021/033830.

Office Action dated Dec. 20, 2025, issued in counterpart CN Application No. 202180066149.8, with partial English translation. (12 pages).

Hamedi, M. et al., Highly Conducting, Strong Nanocomposites Based on Nanocellulose-Assisted Aqueous Dispersions of Single-Wall Carbon Nanotubes, ACS Nano, vol. 8, No. 3, p. 2467-2476, 2014 (10 pages); Cited in CN Office Action dated Dec. 20, 2025.

* cited by examiner

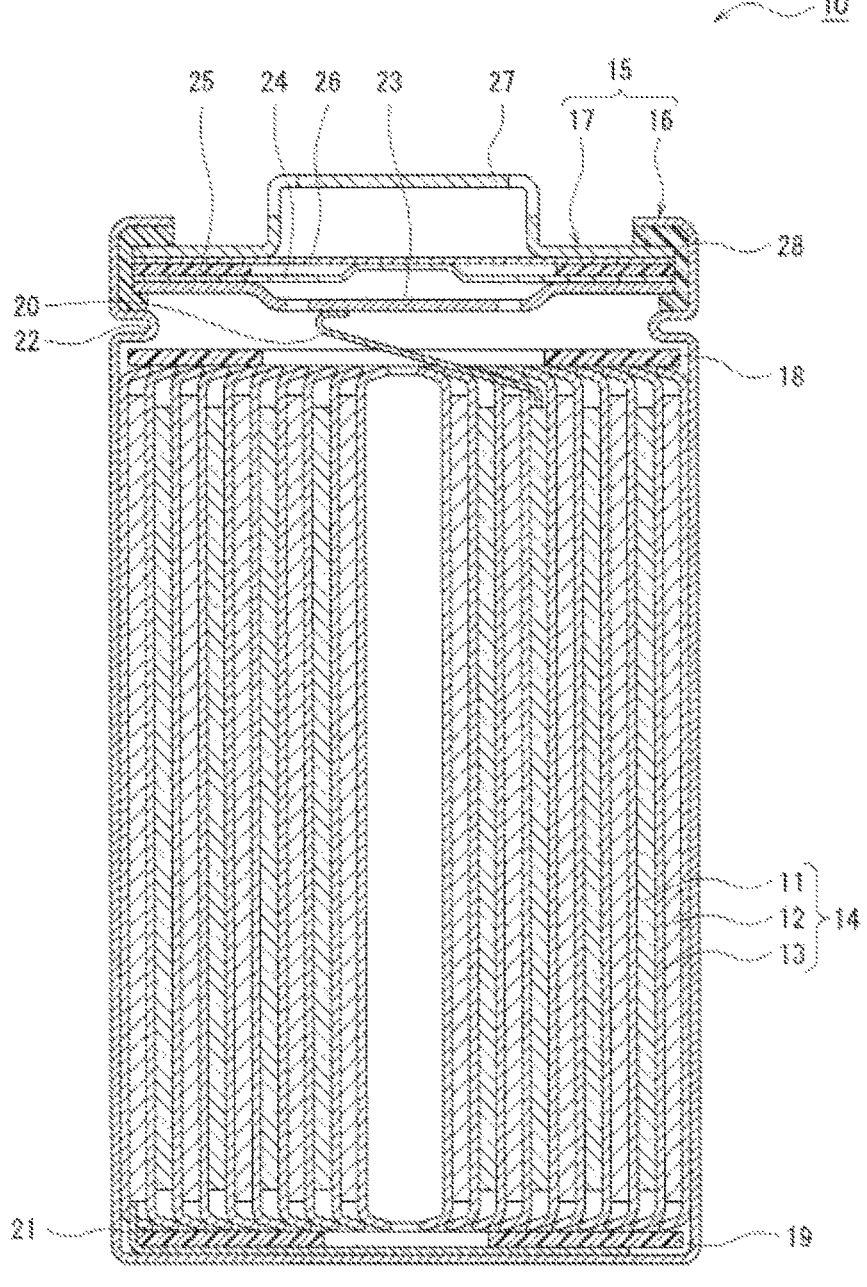

1

SECONDARY BATTERY NEGATIVE ELECTRODE AND SECONDARY BATTERY

CROSS REFERENCE TO RELATED APPLICATIONS

This Application is the National Stage of International Application No. PCT/JP2021/033830, filed Sep. 15, 2021, which claims priority from Application No. 2020-165609 filed on Sep. 30, 2020 in Japan. The entire contents of these applications are incorporated herein by reference in their entirety.

TECHNICAL FIELD

The present disclosure relates to a negative electrode for secondary batteries and to a secondary battery.

BACKGROUND

Si compounds are alloying materials to be alloyed with lithium. It is known that a Si compound can occlude a larger amount of lithium ions per unit volume than a carbon-based active material such as graphite, and Si compounds are expected to be used in a negative electrode active material of a secondary battery.

However, a Si compound has a large volume change (expansion and contraction) at the time of charge and discharge, and therefore repeated charge and discharge disconnects the conductive network between the negative electrode active materials. As a result, there is a problem of deterioration of charge-discharge cycle characteristics.

For solving such a problem, Patent Literature 1 discloses a technique in which a carbon nanotube is added into a negative electrode mixture layer having a Si compound to suppress disconnection of the conductive network between the negative electrode active materials due to expansion and contraction of the Si compound and to suppress deterioration of charge-discharge cycle characteristics.

CITATION LIST

Patent Literature

Patent Literature 1: JP 2016-110876 A
Patent Literature 2: JP 2017-228456 A

SUMMARY

In secondary batteries using a negative electrode active material containing a Si compound, further improvement of charge-discharge cycle characteristics is desired.

A negative electrode for secondary batteries of an aspect of the present disclosure includes a negative electrode mixture layer including a negative electrode active material containing a Si compound, a conductive agent containing a single-walled carbon nanotube having a fiber diameter of less than 4 nm, and a binder containing a cellulose nanofiber having a fiber diameter of less than or equal to 9 nm, and the content of the cellulose nanofiber is greater than or equal to 0.005 mass % and less than 0.2 mass % of the mass of the negative electrode active material.

A secondary battery of an aspect of the present disclosure includes a positive electrode, a negative electrode, and a non-aqueous electrolyte, and the negative electrode is the above-described negative electrode for secondary batteries.

According to an aspect of the present disclosure, charge-discharge cycle characteristics can be improved in a secondary battery using a negative electrode active material containing a Si compound.

BRIEF DESCRIPTION OF DRAWINGS

FIG. 1 is a sectional view of a secondary battery of an example of an embodiment.

DESCRIPTION OF EMBODIMENTS

A negative electrode for secondary batteries of an aspect of the present disclosure includes a negative electrode mixture layer including a negative electrode active material containing a Si compound, a conductive agent containing a single-walled carbon nanotube having a fiber diameter of less than 4 nm, and a binder containing a cellulose nanofiber having a fiber diameter of less than or equal to 9 nm, and the content of the cellulose nanofiber is greater than or equal to 0.005 mass % and less than 0.2 mass % of the mass of the negative electrode active material. According to a negative electrode for secondary batteries of an aspect of the present disclosure, charge-discharge cycle characteristics can be improved in a secondary battery. The mechanism of exerting the effect is considered to be as follows.

Cellulose nanofibers are considered to be adsorbed on the surface of carbon nanotubes and thus act for improvement of the dispersibility of the carbon nanotubes. Specifically, single-walled carbon nanotubes having a fiber diameter of less than 4 nm themselves tend to aggregate in a bundle, but it is considered that cellulose nanofibers adsorbed on the surface of such single-walled carbon nanotubes act as steric hindrance to the single-walled carbon nanotubes that tend to aggregate in a bundle, and thus improve the dispersibility of the single-walled carbon nanotubes. That is, at the time of manufacturing a negative electrode, for example, single-walled carbon nanotubes can be uniformly dispersed by adding a predetermined amount of cellulose nanofibers having a fiber diameter of less than or equal to 9 nm to a slurry containing a negative electrode active material and carbon nanotubes having a fiber diameter of less than 4 nm. Note that carbon nanotubes having a fiber diameter of greater than or equal to 4 nm themselves tend to be entangled like dust and aggregate. Therefore, cellulose fibers are less likely to act as steric hindrance, and thus such carbon nanotubes cannot be uniformly dispersed. Therefore, it is considered that as in the negative electrode of the present embodiment, aggregation of the single-walled carbon nanotube is suppressed (for example, uniform dispersion is achieved) due to the presence of the cellulose nanofiber having a fiber diameter of less than or equal to 9 nm contained in a predetermined amount and thus a conductive network between the negative electrode active material containing the Si compound and the single-walled carbon nanotube is sufficiently formed to improve charge-discharge cycle characteristics.

Hereinafter, an example of an embodiment will be described in detail with reference to the drawing. Note that the non-aqueous electrolyte secondary battery of the present disclosure is not limited to the embodiments described below. The drawing referred to in the description of an embodiment is schematically illustrated.

FIG. 1 is a sectional view of a secondary battery of an example of an embodiment. A secondary battery 10 shown in FIG. 1 includes a wound electrode assembly 14 in which a positive electrode 11 and a negative electrode 12 are wound with a separator 13 interposed therebetween, a non-aqueous electrolyte, insulating plates 18 and 19 disposed on the upper and lower sides of the electrode assembly 14 respectively, and a battery case housing the above-described members. The battery case 15 includes a bottomed cylindrical case body 16 and a sealing assembly 17 that seals an opening of the case body 16. Instead of the wound electrode assembly 14, an electrode assembly having another form, such as a stacked electrode assembly in which positive electrodes and negative electrodes are alternately stacked with separators interposed therebetween, may be applied. Examples of the battery case 15 include metallic exterior cans having a cylindrical shape, a square shape, a coin shape, a button shape, or the like, and pouch exterior bodies formed by lamination with a resin sheet and a metal sheet.

The case body 16 is, for example, a bottomed cylindrical metallic exterior can. A gasket 28 is provided between the case body 16 and the sealing assembly 17 to ensure the sealability inside the battery. The case body 16 has a projecting portion 22 in which, for example, a part of the side part of the case body 16 protrudes inward to support the sealing assembly 17. The projecting portion 22 is preferably formed in an annular shape along the circumferential direction of the case body 16, and supports the sealing assembly 17 on its upper surface.

The sealing assembly 17 has a structure in which a filter 23, a lower vent member 24, an insulating member 25, an upper vent member 26, and a cap 27 are stacked in this order from the electrode assembly 14 side. Each member included in the sealing assembly 17 has, for example, a disk shape or a ring shape, and the members excluding the insulating member 25 are electrically connected to each other. The lower vent member 24 and the upper vent member 26 are connected to each other at their central parts, and the insulating member 25 is interposed between the circumferential parts of the lower vent member 24 and the upper vent member 26. When the internal pressure of the secondary battery 10 increases due to heat generated by an internal short circuit or the like, for example, the lower vent member 24 deforms so as to push the upper vent member 26 up toward the cap 27 side and breaks, and thus the current pathway between the lower vent member 24 and the upper vent member 26 is cut off. When the internal pressure further increases, the upper vent member 26 breaks, and gas is discharged from an opening of the cap 27.

In the secondary battery 10 shown in FIG. 1, a positive electrode lead 20 attached to the positive electrode 11 extends to the sealing assembly 17 side through a through hole of the insulating plate 18, and a negative electrode lead 21 attached to the negative electrode 12 extends to the bottom side of the case body 16 through the outside of the insulating plate 19. The positive electrode lead 20 is connected to the lower surface of the filter 23, which is the bottom plate of the sealing assembly 17, by welding or the like, and the cap 27, which is electrically connected to the filter 23 and is the top plate of the sealing assembly 17, serves as a positive electrode terminal. The negative electrode lead 21 is connected to the inner surface of the bottom of the case body 16 by welding or the like, and the case body 16 serves as a negative electrode terminal.

Hereinafter, each component in the secondary battery 10 will be described in detail.

[Negative Electrode]

The negative electrode 12 includes a negative electrode current collector made of, for example, a metal foil and a negative electrode mixture layer formed on the current collector. As the negative electrode current collector, for example, a foil of a metal, such as copper, that is stable in a potential range of the negative electrode, or a film in which the metal is disposed on its surface layer is used. The negative electrode mixture layer includes a negative electrode active material, a binder, and a conductive agent.

The negative electrode 12 can be produced by, for example, preparing a negative electrode mixture slurry including a negative electrode active material, a binder, a conductive agent, and the like, applying the negative electrode mixture slurry to the negative electrode current collector, drying the applied slurry to form a negative electrode mixture layer, and then performing a pressing step of pressing the negative electrode mixture layer with a roller or the like.

The negative electrode active material contains a Si compound. The Si compound is to be a material that can occlude and release lithium ions, and from the viewpoint of, for example, increasing the capacity of the secondary battery, it is preferable that the Si compound include a lithium ion conductive phase and Si particles dispersed in the lithium ion conductive phase, and that the lithium ion conductive phase be at least one selected from a silicate phase, a silicon oxide phase, and a carbon phase.

The Si compound preferably has a particle surface on which a conductive film including a material having high conductivity is formed. The constituent material of the conductive film can be exemplified by at least one selected from a carbon material, a metal, and a metal compound. Among them, a carbon material such as amorphous carbon is preferable. The carbon film can be formed with, for example, a CVD method in which acetylene, methane, or the like is used, a method in which coal pitch, petroleum pitch, a phenol resin, or the like is mixed with a silicon-based active material and the mixture is heat-treated, or the like. The conductive film may also be formed by fixing a conductive filler such as carbon black to the particle surface of the Si compound using a binder.

Specific examples of the Si compound include a Si compound A including a silicate phase and Si particles dispersed in the silicate phase, a Si compound B including a silicon oxide phase and Si particles dispersed in the silicon oxide phase, and a Si compound C including a carbon phase and Si particles dispersed in the carbon phase. The compounds may be used singly, or greater than or equal to two of them may be used in combination.

The silicate phase in the Si compound A preferably includes at least one element selected from lithium, sodium, potassium, rubidium, cesium, francium, beryllium, magnesium, calcium, strontium, barium, radium, and the like from the viewpoints of high lithium ion conductivity and the like. Among them, a silicate phase including lithium (hereinafter, sometimes referred to as lithium silicate phase) is preferable.

The Si compound A preferably has a content of the silicon particles of greater than or equal to 30 mass % and less than or equal to 80 mass %, preferably greater than or equal to mass % and less than or equal to 75 mass %, and more preferably greater than or equal to 55 mass % and less than or equal to 70 mass % from the viewpoints of increasing the capacity, improving charge-discharge cycle characteristics, and the like.

The Si particles preferably has an average particle diameter of less than or equal to 500 nm, more preferably less than or equal to 200 nm, and still more preferably less than or equal to 50 nm before the initial charge, for example, from the viewpoints of restraining the Si particles themselves from cracking, and the like. After the initial charge, the average particle diameter of the Si particles is preferably less than or equal to 400 nm, and more preferably less than or equal to 100 nm. The average particle diameter of the Si particles is measured by observing a sectional scanning electron microscope (SEM) photograph of the Si compound. Specifically, the average particle diameter of the Si particles is determined by averaging the maximum diameters of 100 arbitrary Si particles.

The lithium silicate phase is represented by, for example, the formula: $Li_{2z}SiO_{2+z}$ (0<<z<2). From the viewpoints of stability, ease of production, lithium ion conductivity, and the like, z preferably satisfies the relation of 0<z<1, and more preferably z=½.

The Si compound B in which Si particles are dispersed in a silicon oxide phase is represented by, for example, the general formula $SiO_x$ (in which x is preferably in the range of 0<x<2, and more preferably in the range of 0.5<x<1.6). The Si compound C in which Si particles are dispersed in a carbon phase is represented by, for example, the general formula $Si_xC_y$ (in which x and y are preferably in the ranges of 0<x≤1 and 0<y≤1, and more preferably in the ranges of 0.3≤x≤0.45 and 0.7≤y≤0.55). The carbon phase includes, for example, at least one of amorphous carbon or crystalline carbon. The content and the average particle diameter of the Si particles in the Si compounds B and C may be similar to those in the Si compound A.

The content of the Si compound in the negative electrode active material is preferably greater than or equal to 1 mass % and less than or equal to 10 mass % of the mass of the negative electrode active material, for example, from the viewpoints of increasing the capacity of the secondary battery, improving charge-discharge cycle characteristics, and the like.

The negative electrode active material preferably contains graphite particles from the viewpoints of improving charge-discharge cycle characteristics of the secondary battery, and the like. Examples of the graphite particles include natural graphite and artificial graphite, and are not particularly limited. The graphite particles preferably have a plane spacing of the (002) plane ($d_{002}$) determined with a wide angle X-ray diffraction method of, for example, greater than or equal to 0.3354 nm and more preferably greater than or equal to 0.3357 nm, and preferably less than 0.340 nm and more preferably less than or equal to 0.338 nm. The graphite particles preferably have a crystallite size (Lc(002)) determined with an X-ray diffraction method of, for example, greater than or equal to 5 nm and more preferably greater than or equal to 10 nm, and preferably less than or equal to 300 nm and more preferably less than or equal to 200 nm. In a case where the plane spacing ($d_{002}$) and the crystallite size (Lc(002)) satisfy the above ranges, the secondary battery tends to have a larger battery capacity than in a case where the above ranges are not satisfied.

The content of the graphite particles in the negative electrode active material is preferably greater than or equal to 80 mass % and less than or equal to 90 mass % of the mass of the negative electrode active material, for example, from the viewpoints of increasing the capacity of the secondary battery, improving charge-discharge cycle characteristics, and the like.

The content of the negative electrode active material in the negative electrode mixture layer is, for example, preferably greater than or equal to 85 mass %, more preferably greater than or equal to 90 mass %, and still more preferably greater than or equal to 95 mass % of the mass of the negative electrode mixture layer.

The conductive agent included in the negative electrode mixture layer contains a single-walled carbon nanotube. A single-walled carbon nanotube (SWCNT) is a carbon nanostructure in which one graphene sheet forms one cylindrical shape. The graphene sheet refers to a layer in which a carbon atom in an sp2 hybrid orbital forming a crystal of graphite is located at an apex of a regular hexagon. The shape of the single-walled carbon nanotube is not limited, and examples of the shape include needle shapes, cylindrical tube shapes, fishbone shapes (fishbone or cup-stacked type), trump shapes (platelets), and coil shapes.

The outermost diameter (that is, the fiber diameter) of the single-walled carbon nanotube is to be less than 4 nm, for example, from the viewpoints of ease of forming a conductive network with the negative electrode active material, and the like, and is preferably greater than or equal to 1 nm and less than or equal to 3 nm. The outermost diameter of the single-walled carbon nanotube can be determined by measuring the outer diameters of 50 arbitrary carbon nanotubes with a field-emission scanning electron microscope (FE-SEM) or a transmission electron microscope (TEM) and arithmetically averaging the outer diameters.

The fiber length of the single-walled carbon nanotube is preferably greater than or equal to 500 nm and less than or equal to 200 µm, and preferably greater than or equal to 1 µm and less than or equal to 100 µm, for example, from the viewpoints of efficiently forming a conductive network with the negative electrode active material, and the like. The fiber length of the single-walled carbon nanotube can be determined by measuring the lengths of 50 arbitrary single-walled carbon nanotubes with a field-emission scanning electron microscope (FE-SEM) and arithmetically averaging the lengths.

The content of the single-walled carbon nanotube is preferably greater than or equal to 0.001 mass % and less than or equal to 0.1 mass %, and more preferably greater than or equal to 0.01 mass % and less than or equal to 0.1 mass % of the mass of the negative electrode active material, for example, from the viewpoints of efficiently forming a conductive network with the negative electrode active material, and the like.

The conductive agent may contain a multi-walled carbon nanotube in addition to the single-walled carbon nanotube as long as an effect of the present disclosure is not impaired. A multi-walled carbon nanotube is a carbon nanostructure in which two or more graphene sheets are concentrically stacked to form one cylindrical shape.

The conductive agent may contain a particulate conductive agent as necessary. Examples of the particulate conductive agent include carbon materials such as carbon black, acetylene black, Ketjenblack, and graphite. When used, the particulate conductive agent preferably has a primary particle diameter of greater than or equal to 5 nm and less than or equal to 100 nm, and preferably has an aspect ratio of less than 10.

The binder contains a cellulose nanofiber. A cellulose nanofiber is a fine fiber containing cellulose, which forms skeletons of cell walls in plants. The cellulose nanofiber is to have a fiber diameter of less than or equal to 9 nm, but from the viewpoint of further improving the dispersibility of the single-walled carbon nanotube, the fiber diameter is preferably greater than or equal to 1 nm and less than or equal to 8 nm, and more preferably greater than or equal to 1 nm and less than or equal to 3 nm. The method of measuring the fiber diameter is similar to that for the carbon nanotube.

The cellulose nanofiber preferably has a fiber length of greater than or equal to 1 µm and less than or equal to 20 µm, and more preferably greater than or equal to 5 µm and less than or equal to 10 μm, for example, from the viewpoint of further improving the dispersibility of the single-walled carbon nanotube. The method of measuring the fiber length is similar to that for the carbon nanotube.

The content of the cellulose nanofiber is to be greater than or equal to 0.005 mass % and less than or equal to 0.2 mass %, and is preferably greater than or equal to 0.005 mass % and less than or equal to 0.1 mass %, and more preferably greater than or equal to 0.01 mass % and less than or equal to 0.1 mass % of the mass of the negative electrode active material from the viewpoint of further improving charge-discharge cycle characteristics.

The binder may contain, for example, a fluorine-based resin, PAN, a polyimide-based resin, an acryl-based resin, a polyolefin-based resin, styrene-butadiene rubber (SBR), carboxymethyl cellulose (CMC) or its salt, polyacrylic acid (PAA) or its salt, polyvinyl alcohol (PVA), and the like, in addition to the cellulose nanofiber. These may be used singly, or greater than or equal to two of them may be used in combination.

[Positive Electrode]

The positive electrode 11 includes a positive electrode current collector such as a metal foil and a positive electrode mixture layer formed on the positive electrode current collector. As the positive electrode current collector, a foil of a metal, such as aluminum, that is stable in a potential range of the positive electrode, a film in which the metal is disposed on its surface layer, or the like can be used. The positive electrode mixture layer includes, for example, a positive electrode active material, a binder, a conductive agent, and the like.

The positive electrode 11 can be produced by, for example, applying a positive electrode mixture slurry including a positive electrode active material, a binder, a conductive agent, and the like to the positive electrode current collector, drying the applied slurry to form a positive electrode mixture layer, and then performing a pressing step of pressing the positive electrode mixture layer with a roller or the like.

Examples of the positive electrode active material include lithium-transition metal oxides containing a transition metal element such as Co, Mn, or Ni. Examples of the lithium-transition metal oxides include $Li_xCoO_2$, $Li_xNiO_2$, $Li_xMnO2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M; at least one of Na, Mg, Sc, Y, Mn, Fe, Co, Ni, Cu, Zn, Al, Cr, Pb, Sb, or B, $0<x<1.2$, $0<y\leq0.9$, $2.0\leq z\leq2.3$). These may be used singly, or a plurality of kinds of them may be mixed and used. The positive electrode active material preferably contains a lithium-nickel composite oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, or B, $0<x\leq1.2$, $0<y\leq0.9$, $2.0\leq z\leq2.3$) from the viewpoint of being able to increase the capacity of the secondary battery.

Examples of the conductive agent include carbon-based particles such as carbon black (CB), acetylene black (AB), Ketjenblack, and graphite. These may be used singly, or greater than or equal to two of them may be used in combination.

Examples of the binder include fluorine-based resins such as polytetrafluoroethylene (PTFE) and polyvinylidene fluoride (PVdF), polyacrylonitrile (PAN), polyimide-based resins, acryl-based resins, and polyolefin-based resins. These may be used singly, or greater than or equal to two of them may be used in combination.

[Separator]

As the separator 13, for example, a porous sheet having an ion permeation property and an insulation property is used. Specific examples of the porous sheet include fine porous thin films, woven fabrics, and nonwoven fabrics. As a material of the separator, olefin-based resins such as polyethylene and polypropylene, cellulose, and the like are suitable. The separator 13 may be a stacked body having a cellulose fiber layer and a thermoplastic resin fiber layer such as an olefin-based resin. The separator may be a multilayer separator including a polyethylene layer and a polypropylene layer, and a separator may be used that has a surface to which a material such as an aramid-based resin or a ceramic is applied.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (electrolytic solution), and may be a solid electrolyte in which a gel polymer or the like is used. Examples of a solvent that can be used as the non-aqueous solvent include esters, ethers, nitriles such as acetonitrile, amides such as dimethylformamide, and mixed solvents of greater than or equal to two of them. The non-aqueous solvent may contain a halogen-substituted product in which at least a part of hydrogen in a solvent described above is substituted with a halogen atom such as fluorine.

Examples of the esters include cyclic carbonic acid esters such as ethylene carbonate (EC), propylene carbonate (PC), and butylene carbonate, chain carbonic acid esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters such as γ-butyrolactone and γ-valerolactone, and chain carboxylic acid esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the halogen-substituted product, an ester is preferably used such as a fluorinated cyclic carbonic acid ester such as fluoroethylene carbonate (FEC), a fluorinated chain carbonic acid ester, or a fluorinated chain carboxylic acid ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lower aliphatic lithium carboxylates, and borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are integers of greater than or equal to 1}. These lithium salts may be used singly, or a plurality of kinds of them may be mixed and used. Among these lithium salts, $LiPF_6$ is preferably used from the viewpoints of ion conductivity, electrochemical stability, and the like. The concentration of the lithium salt is preferably greater than or equal to 0.8 and less than or equal to 1.8 mol in 1 L of the solvent.

EXAMPLES

Hereinafter, the present disclosure will be further described with reference to Examples, but the present disclosure is not limited to these Examples.

Example 1

[Production of Negative Electrode]

Graphite particles and a Si compound were mixed at a mass ratio of 90:10. This mixture was used as a negative electrode active material. A single-walled carbon nanotube (SWCNT) having a fiber diameter of greater than or equal to 1 nm and less than or equal to 3 nm and a cellulose nanofiber (CNF) having a fiber diameter of greater than or equal to 3 nm and less than or equal to 4 nm were prepared. The negative electrode active material, the SWCNT, the CNF, carboxymethyl cellulose (CMC), and styrene-butadiene copolymer rubber (SBR) were mixed at a mass ratio of 100:0.05:0.01:1:2 to prepare a negative electrode mixture slurry. This slurry was applied to both surfaces of a current collector made of a copper foil with a doctor blade method, the applied film was dried and then pressed with a roller to produce a negative electrode in which a negative electrode mixture layer was formed on both surfaces of a negative electrode current collector.

[Production of Positive Electrode]

As a positive electrode active material, aluminum-containing lithium nickel cobalt oxide ($LiNi_{0.88}Co_{0.09}Al_{0.03}O_2$) was used. In a solvent of N-methyl-2-pyrrolidone (NMP), 100 parts by mass of the positive electrode active material, 1 part by mass of acetylene black, and 0.9 parts by mass of polyvinylidene fluoride were mixed to prepare a positive electrode mixture slurry. This slurry was applied to both surfaces of an aluminum foil having a thickness of 15 μm, the applied film was dried and then rolled with a roller to produce a positive electrode in which a positive electrode mixture layer was formed on both surfaces of a positive electrode current collector.

[Production of Non-Aqueous Electrolyte]

$LiPF_6$ was dissolved at a concentration of 1.4 mol/L in a non-aqueous solvent obtained by mixing ethylene carbonate (EC), methyl ethyl carbonate (MEC), and dimethyl carbonate (DMC) at a volume ratio of 20:5:75, and 3 mass % of vinylene carbonate and 0.5 mass % of 1,6-diisocyanato-hexane were further added. The resulting mixture was used as a non-aqueous electrolyte.

[Production of Secondary Battery]

(1) An aluminum positive electrode lead was attached to the positive electrode current collector, a nickel-copper-nickel negative electrode lead was attached to the negative electrode current collector, and then the positive electrode and the negative electrode were wound with a polyethylene separator interposed therebetween to produce a wound electrode assembly.

(2) Insulating plates were disposed above and below the electrode assembly, respectively, the negative electrode lead was welded to a case body, the positive electrode lead was welded to a sealing assembly, and the electrode assembly was housed in the case body.

(3) The non-aqueous electrolyte was injected into the case body with a reduced pressure method, then the open end of the case body was crimped to the sealing assembly via a gasket. The resulting product was used as a secondary battery.

Example 2

A secondary battery was produced in the same manner as in Example 1 except that the negative electrode active material, the SWCNT, the CNF, CMC, and styrene-butadiene copolymer rubber (SBR) were mixed at a mass ratio of 100:0.05:0.03:1:2.

Example 3

A secondary battery was produced in the same manner as in Example 1 except that the negative electrode active material, the SWCNT, the CNF, CMC, and styrene-butadiene copolymer rubber (SBR) were mixed at a mass ratio of 100:0.05:0.1:1:2.

Example 4

A secondary battery was produced in the same manner as in Example 1 except that a cellulose nanofiber (CNF) having a fiber diameter of greater than or equal to 8 nm and less than or equal to 9 nm was used and the negative electrode active material, the SWCNT, the CNF, CMC, and styrene-butadiene copolymer rubber (SBR) were mixed at a mass ratio of 100:0.05:0.1:1:2.

Comparative Example 1

A secondary battery was produced in the same manner as in Example 1 except that the cellulose nanofiber (CNF) having a fiber diameter of greater than or equal to 3 nm and less than or equal to 4 nm was not used and the negative electrode active material, the SWCNT, CMC, and styrene-butadiene copolymer rubber (SBR) were mixed at a mass ratio of 100:0.05:1:2.

Comparative Example 2

A secondary battery was produced in the same manner as in Example 1 except that the negative electrode active material, the SWCNT, the CNF, CMC, and styrene-butadiene copolymer rubber (SBR) were mixed at a mass ratio of 100:0.05:0.2:1:2.

Comparative Example 3

A secondary battery was produced in the same manner as in Example 1 except that a cellulose nanofiber (CNF) having a fiber diameter of greater than or equal to 10 nm and less than or equal to 11 nm was used and the negative electrode active material, the SWCNT, the CNF, CMC, and styrene-butadiene copolymer rubber (SBR) were mixed at a mass ratio of 100:0.05:0.1:1:2.

Comparative Example 4

A secondary battery was produced in the same manner as in Example 1 except that a multi-walled carbon nanotube (MWCNT) having a fiber diameter of greater than or equal to 7 nm and less than or equal to 10 nm was used and the negative electrode active material, the MWCNT, the CNF, CMC, and styrene-butadiene copolymer rubber (SBR) were mixed at a mass ratio of 100:0.5:0.1:1:2.

Comparative Example 5

A secondary battery was produced in the same manner as in Example 1 except that a multi-walled carbon nanotube (MWCNT) having a fiber diameter of greater than or equal to 7 nm and less than or equal to 10 nm and a cellulose nanofiber (CNF) having a fiber diameter of greater than or equal to 10 nm and less than or equal to 11 nm were used and the negative electrode active material, the MWCNT, the CNF, CMC, and styrene-butadiene copolymer rubber (SBR) were mixed at a mass ratio of 100:0.5:0.1:1:2.

Comparative Example 6

A secondary battery was produced in the same manner as in Example 1 except that a multi-walled carbon nanotube (MWCNT) having a fiber diameter of greater than or equal to 7 nm and less than or equal to 10 nm was used, the cellulose nanofiber (CNF) having a fiber diameter of greater than or equal to 3 nm and less than or equal to 4 nm was not used, and the negative electrode active material, the MWCNT, CMC, and styrene-butadiene copolymer rubber (SBR) were mixed at a mass ratio of 100:0.5:1:2.

[Charge-Discharge Cycle Test]

Each secondary battery in Examples and Comparative Examples was charged at a constant current of 0.5 C under a temperature environment of 25° C. until the battery voltage reached 4.2 V, and then discharged at a constant current of 0.5 C until the battery voltage reached 2.5 V. This charge-discharge cycle was repeated 100 times, and the capacity maintenance rate was calculated with the following formula.

Capacity maintenance rate (%)=(discharge capacity at 100th cycle÷discharge capacity at 1st cycle)× 100

Table 1 summarizes the results of the capacity maintenance rates in the charge-discharge cycle tests of Examples and Comparative Examples. A higher capacity maintenance rate value indicates that charge-discharge cycle characteristics are more improved.

As can be seen from Table 1, the values of the capacity maintenance rates in Examples 1 to 4 are higher than those in Comparative Examples 1 to 6. Therefore, it can be said that deterioration of charge-discharge cycle characteristics can be suppressed by using a single-walled carbon nanotube having a fiber diameter of less than 4 nm as a conductive agent and using a cellulose nanofiber having a fiber diameter of less than or equal to 9 nm in an amount of greater than or equal to 0.005 mass % and less than 0.2 mass % of the mass of the negative electrode active material as a binder.

REFERENCE SIGNS LIST

10 Secondary battery
11 Positive electrode
12 Negative electrode
13 Separator
14 Electrode assembly
15 Battery case
16 Case body
17 Sealing assembly
18, 19 Insulating plate
20 Positive electrode lead
21 Negative electrode lead
22 Projecting portion
23 Filter
24 Lower vent member
25 Insulating member
26 Upper vent member
27 Cap
28 Gasket

The invention claimed is:

1. A negative electrode for secondary batteries, the negative electrode comprising a negative electrode mixture layer including
    a negative electrode active material containing a Si compound,
    a conductive agent containing a single-walled carbon nanotube having a fiber diameter of less than 4 nm, and
    a binder containing a cellulose nanofiber having a fiber diameter of less than or equal to 9 nm,

TABLE 1

| | CNT | | CNF | | |
| | | | | Content with respect to | |
| Kind | Fiber diameter (nm) | Fiber diameter (nm) | negative electrode active material (mass %) | Capacity maintenance rate (%) |
|---|---|---|---|---|---|
| Example 1 | SWCNT | 1 to 3 | 3 to 4 | 0.01 | 95.5 |
| Example 2 | SWCNT | 1 to 3 | 3 to 4 | 0.03 | 95.3 |
| Example 3 | SWCNT | 1 to 3 | 3 to 4 | 0.1 | 94.8 |
| Example 4 | SWCNT | 1 to 3 | 8 to 9 | 0.1 | 94.6 |
| Comparative Example 1 | SWCNT | 1 to 3 | — | — | 94.3 |
| Comparative Example 2 | SWCNT | 1 to 3 | 3 to 4 | 0.2 | 94.3 |
| Comparative Example 3 | SWCNT | 1 to 3 | 10 to 11 | 0.1 | 94.3 |
| Comparative Example 4 | MWCNT | 7 to 10 | 3 to 4 | 0.1 | 93.3 |
| Comparative Example 5 | MWCNT | 7 to 10 | 10 to 11 | 0.1 | 93.3 |
| Comparative Example 6 | MWCNT | 7 to 10 | — | — | 93.1 | wherein a content of the cellulose nanofiber is greater than or equal to 0.005 mass % and less than 0.2 mass % of a mass of the negative electrode active material.

2. The negative electrode for secondary batteries according to claim 1, wherein the content of the cellulose nanofiber is greater than or equal to 0.005 mass % and less than or equal to 0.1 mass % of the mass of the negative electrode active material.

3. The negative electrode for secondary batteries according to claim 1, wherein a content of the single-walled carbon nanotube is greater than or equal to 0.001 mass % and less than or equal to 0.1 mass % of the mass of the negative electrode active material.

4. The negative electrode for secondary batteries according to claim 1, wherein the cellulose nanofiber has a fiber diameter of greater than or equal to 1 nm and less than or equal to 8 nm.

5. The negative electrode for secondary batteries according to claim 1, wherein the single-walled carbon nanotube has a fiber diameter of greater than or equal to 1 nm and less than or equal to 3 nm.

6. The negative electrode for secondary batteries according to claim 1, wherein the Si compound includes a lithium ion conductive phase and silicon particles dispersed in the lithium ion conductive phase.

7. The negative electrode for secondary batteries according to claim 6, wherein the lithium ion conductive phase includes at least one of a silicate, silicon oxide, amorphous carbon, or crystalline carbon.

8. A secondary battery comprising a positive electrode, a negative electrode, and a non-aqueous electrolyte, the negative electrode being the negative electrode for secondary batteries according to claim 1.

9. The negative electrode for secondary batteries according to claim 1, wherein the content of cellulose nanofiber is greater than or equal to 0.01 mass % and less than or equal to 0.1 mass % of a mass of the negative electrode active material.

10. The negative electrode for secondary batteries according to claim 1, wherein the cellulose nanofiber has a fiber length of greater than or equal to 5 μm and less than or equal to 10 μm.

11. The negative electrode for secondary batteries according to claim 1, wherein the content of the single-walled carbon nanotube is greater than or equal to 0.01 mass % and less than or equal to 0.1 mass % of the mass of the negative electrode active material.

* * * * *